United States Patent [19]
LeMasurier

[11] Patent Number: 5,810,285
[45] Date of Patent: Sep. 22, 1998

[54] DRIVE SHAFT CASING FOR A DUCTED FAN ANTI-TORQUE DEVICE

[75] Inventor: Philip H. LeMasurier, New Fairfield, Conn.

[73] Assignee: Sikorsky Aircraft Corporation, Stratford, Conn.

[21] Appl. No.: 770,314

[22] Filed: Dec. 20, 1996

[51] Int. Cl.⁶ .................................................. B64C 27/82
[52] U.S. Cl. ................... 244/17.19; 415/119; 415/208.1; 415/211.1
[58] Field of Search ............................. 244/17.19, 17.21; 415/119, 191, 208.1, 211.1

[56] References Cited

U.S. PATENT DOCUMENTS

| | | | |
|---|---|---|---|
| 3,583,659 | 6/1971 | Lermusiaux | 244/17.19 |
| 3,943,410 | 3/1976 | Williams | 415/119 |
| 4,196,877 | 4/1980 | Mutrux | 244/17.19 |
| 5,102,067 | 4/1992 | Weiner et al. | 244/17.19 |
| 5,108,044 | 4/1992 | Weiner et al. | 244/17.19 |
| 5,131,604 | 7/1992 | Yoerkie, Jr. et al. | 244/17.19 |
| 5,419,680 | 5/1995 | Asano et al. | 415/119 |

*Primary Examiner*—S. Joseph Morano
*Attorney, Agent, or Firm*—Adam C. Solomon

[57] ABSTRACT

A drive shaft casing for a ducted fan anti-torque device for reducing the radar signature of the drive shaft, while concurrently having a minimal impact on the drive shaft's acoustic signature. The casing is formed from radar absorbing material and is disposed about the drive shaft such that the drive shaft casing comprises an inboard region spaced proximal to the hub and defining a thickness profile relative to a high speed flow of air provided by the fan assembly, and an outboard region spaced proximal to the inner surface of the airflow duct and defining a thickness profile relative to the high speed flow of air, wherein the thickness profile for the outboard region is less than the thickness profile for the inboard region.

12 Claims, 3 Drawing Sheets

5,810,285

DRIVE SHAFT CASING FOR A DUCTED FAN ANTI-TORQUE DEVICE

This invention was made with Government support under Contract No. DAAJ09-91-C-A004 awarded by the Department of the Army. The Government has certain rights in this invention.

TECHNICAL FIELD

This invention relates generally to ducted fan anti-torque devices for helicopters, and more particularly, to a drive shaft casing for a ducted fan anti-torque device that reduces the radar signature of the drive shaft, while concurrently having a minimal impact on the drive shaft's acoustic signature.

BACKGROUND ART

Helicopters embodying fenestron or ducted fan anti-torque devices in their empennage structures provide several aerodynamic and acoustic advantages over helicopters utilizing conventional tail rotor assemblies.

In U.S. Pat. No. 5,131,604, assigned to United Technologies Corp. (hereinafter "'604 patent"), a ducted fan anti-torque device for a helicopter is disclosed having an empennage structure including a shroud configured for internally mounting the ducted fan anti-torque device. The ducted fan anti-torque device has a configuration optimized to provide the anti-torque thrust required for helicopter yaw stability and maneuverability and to minimize the operating noise levels of the ducted fan anti-torque device. As depicted in FIGS. 1 and 2, the ducted fan anti-torque device 100 includes an airflow duct 102 and a fan assembly 104 coaxially mounted within the airflow duct 102. The fan assembly 104 includes a central hub structure 106, a plurality of support struts 108, 110 for coaxially mounting the hub structure 106 in the airflow duct 102, and a plurality of tail rotor blades 112 rotatably mounted on the hub structure 106. The support struts 108, 110 have an elliptical configuration to enhance the aerodynamic performance and reduce the noise generated by the ducted fan anti-torque device 100. One of the support struts 110 is radially orientated and two other struts 108 are non-radially orientated with respect to the axis of the ducted fan anti-torque device 100. The support struts 108, 110 are spaced apart from the plane of the tail rotor blades 112 by a predetermined distance.

The radially-oriented support strut 110 additionally functions as a casing for the tail rotor drive shaft 116 which extends through an opening in the airflow duct 102 and connects to the hub structure 106. Although the shape of the radially-oriented support strut 110 is motivated by aerodynamic and acoustic concerns, the design of the support strut 110 does not address any concerns regarding the radar signature created by the support-strut 110 or the radar signature created by the underlying tail rotor drive shaft 116.

DISCLOSURE OF THE INVENTION

It is therefore an object of the present invention to provide a drive shaft casing for a ducted fan anti-torque device that reduces the radar signature of the drive shaft.

Another object of the present invention is to provide a drive shaft casing for a ducted fan anti-torque device that reduces the radar signature of the drive shaft while also presenting a minimal acoustic signature.

These and other objects are achieved in the present invention, by a drive shaft casing provided in a ducted fan anti-torque device. The ducted fan anti-torque device is included in a helicopter having an empennage structure with a shroud, and comprises an airflow duct extending through the shroud, wherein the airflow duct defines an inner surface and a longitudinal axis. A fan assembly is mounted in the airflow duct for generating a high speed flow of air for yaw stability and maneuverability of the helicopter. The fan assembly comprises a hub coaxially mounted about the longitudinal axis, and a plurality of fan blades connected to the hub, wherein the plurality of fan blades defines a blade plane. A drive shaft extends through an opening in the inner surface of the airflow duct and connects to the hub for driving the fan blades, wherein the drive shaft is disposed adjacent to the blade plane such that the drive shaft is disposed within the high speed flow of air.

The drive shaft casing is formed from radar absorbing material and is disposed about the drive shaft. The drive shaft casing comprises an inboard region spaced proximal to the hub and defining a thickness profile relative to the high speed flow of air, and an outboard region spaced proximal to the inner surface of the airflow duct and defining a thickness profile relative to the high speed flow of air, wherein the thickness profile for the outboard region is less than the thickness profile for the inboard region.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BEST MODE FOR CARRYING OUT THE INVENTION

Figure 1:
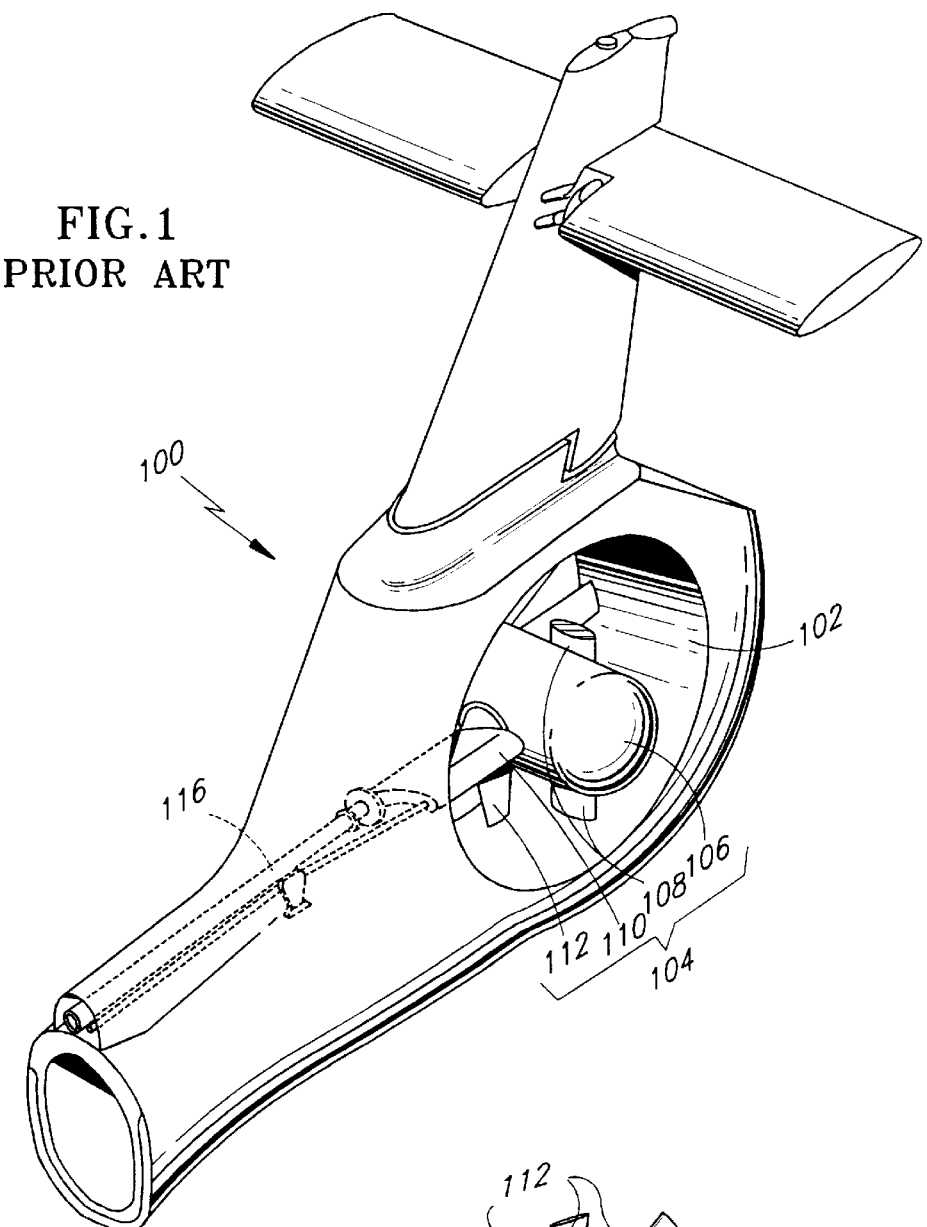
FIG. 1 is a perspective view, partly broken away, of a helicopter's empennage structure, depicting a prior art ducted fan anti-torque device.
Figure 2:
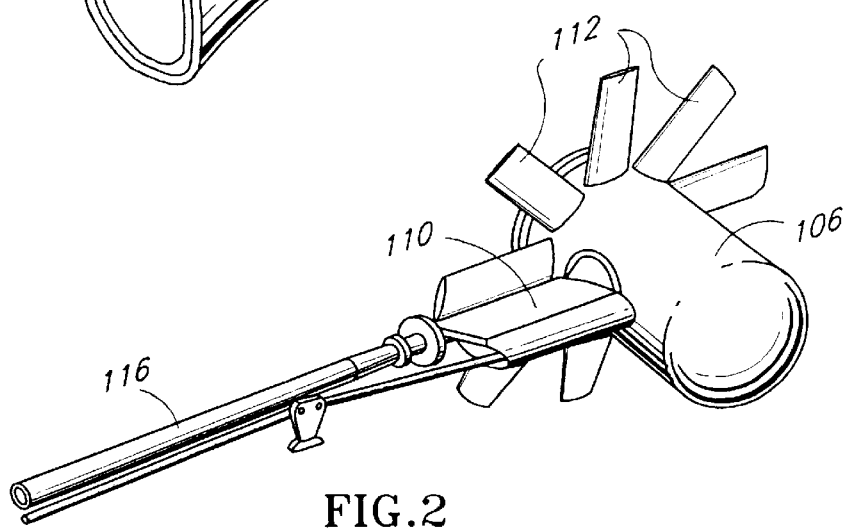
FIG. 2 is a perspective view, partly broken away, of the prior art fan assembly, drive shaft, and drive shaft casing in FIG. 1.
Figure 3:
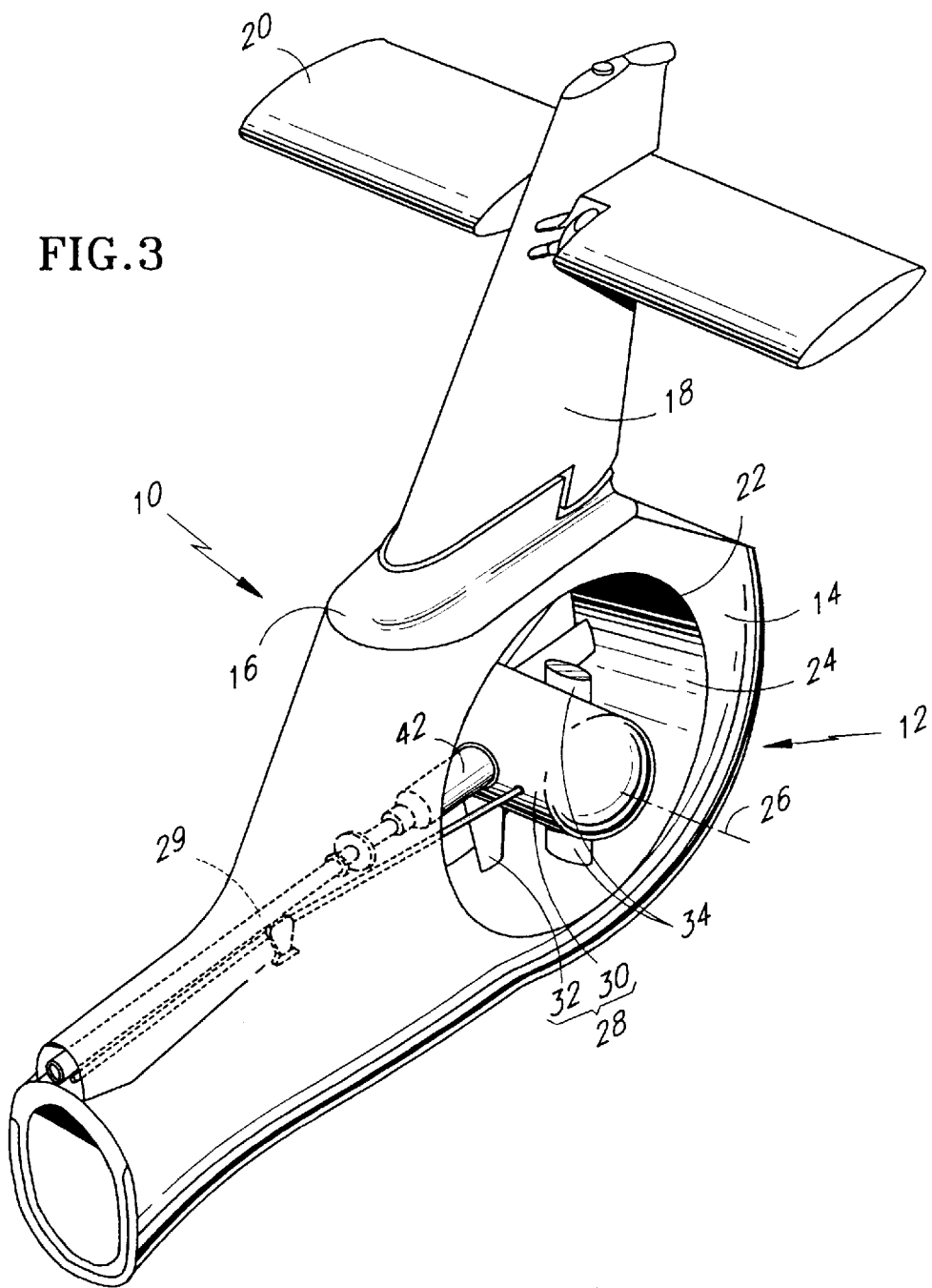
FIG. 3 is a perspective view, partly broken away, of a helicopter's empennage structure having a ducted fan anti-torque device embodying features of the present invention.

Referring to FIG. 3, an empennage structure 10 for a Boeing Sikorsky RAH-66 Comanche helicopter (not shown) is illustrated, exemplary of a structure capable of embodying the present invention. The empennage structure 10 comprises a ducted fan anti-torque device 12 enclosed within a shroud 14, a shroud-fin integration shelf 16, a vertical fin or stabilizer 18, and a horizontal fin or stabilizer 20 intersecting the vertical stabilizer 18.

The ducted fan anti-torque device 12 comprises an airflow duct 22, fan assembly 28, and a drive shaft 29. The airflow duct 22 extends through the shroud 14 and is substantially cylindrical in shape such that it defines an inner surface 24 and a longitudinal axis 26, wherein the longitudinal axis 26 is the radial centerline of the airflow duct 22. The fan assembly 28 is mounted within the airflow duct 22 and provides a high speed flow of air for yaw stability and maneuverability of the helicopter.

Figure 4:
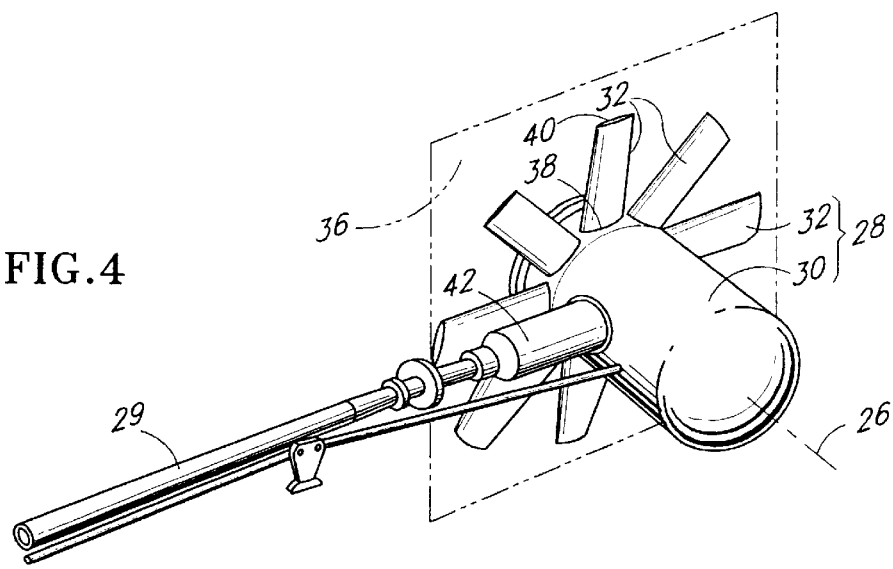
FIG. 4 is a perspective view, partly broken away, of the fan assembly, drive shaft, and drive shaft casing in FIG. 3.

As illustrated in FIGS. 3 and 4, the fan assembly 28 comprises a hub 30 coaxially mounted about the longitudinal axis 26, and having a plurality of fan blades 32 connected to the hub 30. The hub 30 is supported within the airflow duct 22 with a plurality of support struts 34, wherein the support struts 34 ensure that the rotational axis of the hub 30 corresponds with the longitudinal axis 26 of the airflow duct 22. In the described embodiment, a pair of collinear, aerodynamically-configured support struts 34 are radially off-set from the longitudinal axis 26, thereby providing non-radial mounting structures between the hub 30 and the airflow duct 22.

The plurality of fan blades 32 are connected to the hub 30 in a conventional manner as is known in the art for connecting fan blades to hubs in ducted fan anti-torque devices, wherein each of the fan blades 32 comprises a blade root 38 and a blade tip 40. Each of the fan blades 32 is connected to the hub 30 at the blade root 38 and extends radially to the blade tip 40 which is located proximal to the inner surface 24 of the airflow duct 22. In the described embodiment, eight fan blades 32 are connected to the hub 30 and define a blade plane 36, wherein the blade plane 36 is substantially perpendicular to the longitudinal axis 26. In addition, each of the blade tips 40 is spaced approximately 0.254 cm (0.1 inches) from the inner surface 24 of the airflow duct 22 in order to minimize pressure losses across the fan blades 32, thereby optimizing performance of the fan assembly 28.

In the described embodiment, for the Boeing Sikorsky RAH-66 Comanche helicopter, each of the fan blades 32 has an untapered planform configuration which provides maximum thrust generating capability and simplifies blade manufacturing procedures. The airfoil section of the fan blades 32 is a NACA 64 series such as the 64A322 airfoil which provides the best performance (design tip speed) over a required range of operating conditions. Each fan blade 32 has a predetermined chord to provide high solidity to meet yaw acceleration design performance requirements and low blade loading. In the described embodiment, each fan blade 32 has a predetermined twist of about −7° twist hub-to-tip to provide good control response, particularly at low and negative thrust levels.

Referring to FIGS. 3 and 4, the drive shaft 29 is connected at one end to a drive source (not shown), extends longitudinally through an opening in the inner surface 24 of the airflow duct 22, and connects at another end, through a conventional gearing arrangement (not shown), to the hub 30. The drive shaft 29 is rotatably supported such that upon rotation of the drive shaft 29 by the drive source, the drive shaft 29 transfers torque to the gearing arrangement in the hub 30, thereby urging the fan blades 32 into rotational movement about the longitudinal axis 26.

Figure 5:
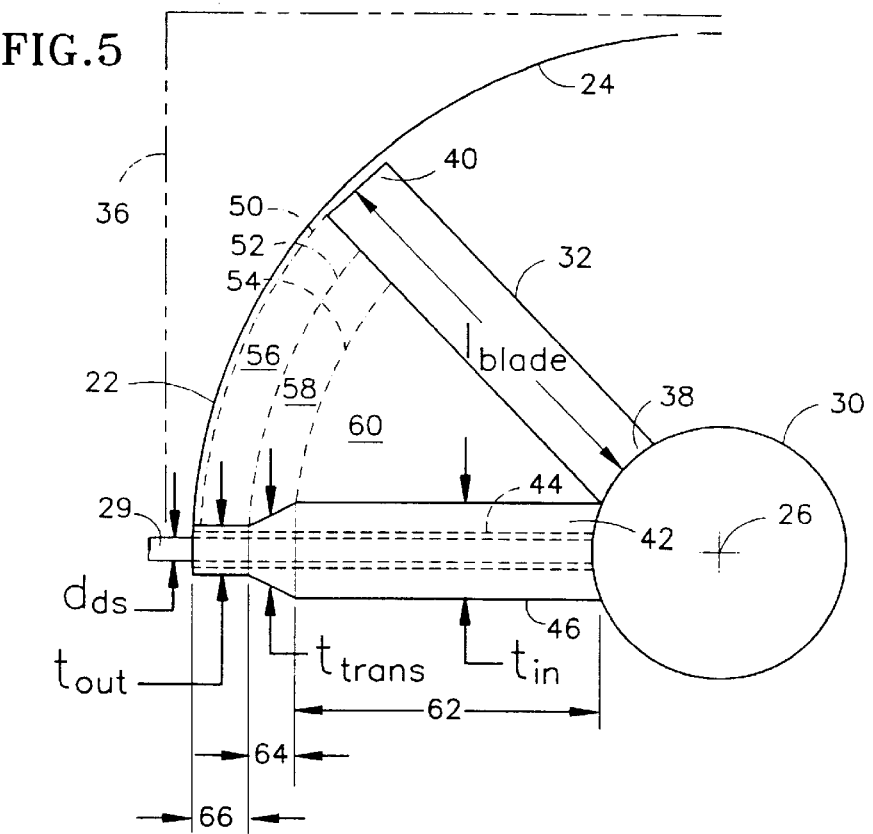
FIG. 5 is a simplified schematic view of the ducted fan anti-torque device in FIG. 3.

In the described embodiment, the drive shaft 29 is formed from metal, thereby providing for strength and durability during operation of the ducted fan anti-torque device 12. However, the exposed nature of the drive shaft 29, in combination with the fact that the drive shaft 29 is formed from metal, is problematic in-so-far-as in the described embodiment, for the Boeing Sikorsky RAH-66 Comanche helicopter, it is desirable to minimize the radar signature for all components of the ducted fan anti-torque device 12. Therefore, according to the present invention, as illustrated in FIGS. 3, 4, and 5, a casing 42 formed from radar absorbing material is disposed about the drive shaft 29 such that the radar signature of the drive shaft 29 is minimized. The radar absorbing material is of a conventional nature as is known in the art for providing low observability to members such as the drive shaft 29, wherein typically these radar absorbing materials comprise a foam core having a low dielectric skin.

The casing 42 has a cylindrically-shaped inner surface 44 with a diameter greater than a diameter $d_{ds}$ for the drive shaft 29, and is fixed at one end to the hub 30 and at another end to the inner surface 24 of the airflow duct 22 such that upon rotation of the drive shaft 29, the casing 42 remains stationary. In the described embodiment, the casing 42 also functions as support structure between the airflow duct 22 and the hub 30, thereby providing support to the hub 30 in addition to the two support struts 34. In order to support the hub 30, the casing 42 can be formed as a radar absorbing structure of a type known in the art for providing low observability in addition to supporting loads. The configuration of the outer surface 46 will be discussed in greater detail below following a brief discussion of the acoustic signatures created by an interaction between the high speed flow of air and the casing 42.

As illustrated in FIGS. 3 and 4, the drive shaft 29 is disposed adjacent to the blade plane 36, such that upon rotational movement of the fan blades 32, the high speed flow of air produced by the fan blades 32 impinges upon the casing 42. Since the casing 42 is spaced relatively close to the blade plane 36, the high speed flow of air generated by a particular fan blade 32 as it passes the casing 42, impinges upon the casing 42, and creates a back pressure against that fan blade 32. As the fan blade 32 rotates away from the casing 42, the back pressure is relieved. It will be appreciated that as the fan blades 32 rotate, successive fan blades 32 experience these increases and decreases in back pressures. These increases and decreases in back pressures create an interaction tone, which provides an acoustic signature to the casing 42 in the form of noise.

In addition, as will be appreciated by those skilled in the art, the fan blades 32 of the described embodiment comprise a relatively small degree of hub-to-tip twist, and therefore, during rotation of the fan blades 32 at a predetermined angular velocity, the velocity of the high speed flow of air generated by each of the fan blades 32 increases along a radial direction from the blade root 38 to the blade tip 40. Therefore, the back pressures exerted against each of the fan blades 32 increases along a radial direction from the blade root 38 to the blade tip 40, and result in the generation of greater noise at the blade tip 40 as compared to the blade root 38.

The relationship between the fan blades 32 and the casing 42 can be illustrated using the parameter D/E, wherein D is the distance between the blade plane 36 and the outer surface 46 of the casing 42, and E is the effective diameter of the casing 42 at a discrete location. From this parameter, it becomes apparent that the greater the value for D/E, the greater the reduction in noise, since larger values for D/E are representative of the outer surface 46 of the casing 42 being spaced distal from the blade plane 36, thereby reducing the magnitude of the back pressure exerted against the fan blades 32. Specifically, D/E ratios greater than 2.7 substantially eliminate any undesirable interaction tones.

In the described embodiment for the Boeing Sikorsky RAH-66 Comanche helicopter, it is desirable to minimize the acoustic signature impact of the drive shaft 29 and its casing 42 in addition to minimizing the radar signature of the drive shaft 29. However, a conflict arises between these two goals since, as is known in the art, thicker applications of radar absorbing material are necessary to absorb low frequency radar, while thicker applications of radar absorbing material also increase the effective diameter E of the casing 42, thereby generating an acoustic signature for the casing 42 that is greater than an acoustic signature for the drive shaft 29 alone. Accordingly, the casing 42 of the present invention comprises an outer surface 46 that is shaped to optimize the casing 42 such that both radar and acoustic signatures are minimized.

Specifically, reference is made to FIG. 5, wherein the configuration of the casing 42 will now be discussed in greater detail. As previously discussed, the interaction tones generated by the fan blades 32 and the casing 42 is greatest proximal to the blade tip 40 when compared to the blade root 38. In particular, approximately 80% to 90% of the noise generated by the fan blades 32 can be attributed to approximately 20% of the outer portion of the fan blades 32 located proximal to the blade tip 40. Therefore, if the effective diameter E of the portion of the casing 42 corresponding to the outer 20% of the fan blades 32 is reduced, it would follow that a significant reduction would be achieved in the acoustic signature impact of the casing 42, while concurrently maintaining an acceptable thickness of radar absorbing material on a majority of the casing 42, thereby minimizing the overall radar signature of the drive shaft 29 and casing 42.

As illustrated in FIGS. 3, 4, and 5, a plurality of arcuate-shaped radial blade stations 50, 52, 54, each being centered at the longitudinal axis 26, are defined on the blade plane 36 such that the radial blade stations 50, 52, 54 correspond to predetermined radial positions on the fan blade 32. A first radial blade station 50 is defined on the blade plane 36 at a position corresponding to the blade tip 40. In the described embodiment, a second radial blade station 52 is defined at a position corresponding to 78% of the blade length $l_{blade}$, wherein the blade length $l_{blade}$ is defined as the radial distance between the blade root 38 and the blade tip 40. In alternative embodiments, the second radial blade station 52 can be defined at positions ranging from 75% to 85% of the blade length $l_{blade}$. In the described embodiment, a third radial blade station 54 is defined at a position corresponding to 66% of the blade length $l_{blade}$. In alternative embodiments, the third radial blade station 54 can be defined at positions ranging from 60% to 70% of the blade length $l_{blade}$.

These radial blade stations 50, 52, 54, in turn, define a plurality of arcuate-shaped regions 56, 58, 60 on the blade plane 36. The first and second radial blade stations 50, 52 define a first region 56, the second and third radial blade stations 52, 54 define a second region 58, and the third radial blade station 54 and the longitudinal axis 26 define a third region 60. In the described embodiment, these regions 56, 58, 60 function to define the configuration of the casing 42.

Specifically, the casing 42 comprises three regions 62, 64, 66 that correspond to the three blade plane 36 regions 56, 58, 60. The casing 42 defines an inboard region 62 spaced proximal to the hub 30, an outboard region 66 spaced proximal to the inner surface 24 of the airflow duct 22, and an transition region 64 disposed therebetween. The inboard region 62 defines a thickness profile $t_{in}$ relative to the high speed flow of air, the outboard region 66 defines a thickness profile $t_{out}$ relative to the high speed flow of air, and the transition region 64 defines a thickness profile $t_{trans}$ relative to the high speed flow of air. It will be appreciated that the outer surface 46 of the casing 42 is circular in cross-section at any radial location along the inboard, transition, and outboard regions 62, 64, 66, and therefore, the thickness profiles $t_{in}$, $t_{trans}$, $t_{out}$ also define the effective diameters E for these regions 62, 64, 66.

As discussed earlier, since approximately 80% to 90% of the noise generated by the interaction between the fan blades 32 and the casing 42 occurs at approximately the outer 20% of the fan blades 32 (which corresponds to the first region 56 of the blade plane 36), then according to the present invention, the thickness profile $t_{out}$ of the outboard region 66 should be sufficiently small such that minimal interaction tones are generated by the outer 20% of the fan blade 32. In the described embodiment, the magnitude of the thickness profile $t_{out}$ for the outboard region 66 should be such that the D/E ratio for cross-sections of the casing 42 in the outboard region 66 are greater than 2. Accordingly, since approximately 10% to 20% of the noise generated by the interaction between the fan blades 32 and the casing 42 occurs at the remaining 80% of the fan blades 32, then according to the present invention, the thickness profile $t_{in}$ of the inboard region 62 is greater than the thickness profile $t_{out}$ for the outboard region 66 in order to provide adequate radar absorption for the drive shaft 29, while concurrently not significantly impacting the overall acoustic signature of the casing 42.

The transition region 64 is interposed between the inboard region 62 and the outboard region 66, and provides a transition in the contour of the outer surface 46 of the casing 42 from the thicker inboard region 62 to the thinner outboard region 66. In the described embodiment, the position of the transition region 64 corresponds to the second region 58 on the blade plane 36. The transition region 64 has a tapered thickness profile $t_{trans}$ such that the transition region 64 is thicker at the side of the transition region 64 proximal to the inboard region 62 and is thinner at the side proximal to the outboard region 66. This tapered thickness profile $t_{trans}$ also functions to provide a transition between the acoustic benefits of the outboard region 66 and the radar absorbing benefits of the inboard region 64.

It will be appreciated that the location of the radial blade stations 50, 52, 54 and the corresponding locations of the blade plane 36 regions 56, 58, 60 depend upon the configuration of the fan assembly 28 and drive shaft 29, in combination with operational and low observability requirements for the ducted fan anti-torque device 12. These factors, in turn, affect the configuration of the casing 42, including the location of the inboard, transition, and outboard regions 62, 64, 66, and the thickness profiles for each of these regions $t_{in}$, $t_{trans}$, $t_{out}$. Although these factors can alter the configuration of the casing 42 in various embodiments, all embodiments of the present invention provide the outboard region 66 corresponding to the region of greatest noise created by the interaction between the fan blades 32 and the casing 42, and having a thickness profile $t_{out}$ such that the D/E ratio for the outboard region 66 is sufficient to minimize interaction tones. In addition, all embodiments of the present invention provide the inboard region 62 substantially corresponding to the balance of the length of the casing 42, and wherein the inboard region 62 has a thickness profile tin greater than the outboard region 66 and being sufficiently thick to provide adequate radar absorption in conformance with predetermined design criteria.

Overall, the reduced thickness of the radar absorbing material at the outboard region 66 provides a significant reduction in the acoustic signature of the casing 42, while not significantly increasing the radar signature provided by the drive shaft 29 and casing 42. In addition, the full thickness of the radar absorbing material at the inboard region 66 provides a significant reduction in the overall radar signature of the drive shaft 29, while concurrently not significantly increasing the acoustic signature for the entire casing 42.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. In a helicopter having an empennage structure including a shroud and a ducted fan anti-torque device comprising:
    (a) an airflow duct extending through said shroud, said airflow duct defining an inner surface and a longitudinal axis,
    (b) a fan assembly mounted in said airflow duct for generating a high speed flow of air for yaw stability and maneuverabilty of said helicopter, said fan assembly comprising
        a hub coaxially mounted about said longitudinal axis, and
        a plurality of fan blades connected to said hub, said plurality of fan blades defining a blade plane; and
    (c) a drive shaft extending through an opening in said inner surface of said airflow duct and connected to said hub for driving said fan blades, said drive shaft being disposed adjacent to said blade plane such that said drive shaft is disposed within said high speed flow of air; and
    a drive shaft casing formed from radar absorbing material and disposed about said drive shaft, said drive shaft casing comprising:
        an inboard region spaced proximal to said hub and defining a thickness profile relative to said high speed flow of air; and
        an outboard region spaced proximal to said inner surface of said airflow duct and defining a thickness profile relative to said high speed flow of air, said thickness profile for said outboard region being less than said thickness profile for said inboard region.

2. The drive shaft casing of claim 1, wherein said fan blades define a first radial blade station and a second radial blade station on said blade plane, said first and said second radial blade stations defining a region therebetween, and wherein said outboard region of said drive shaft casing substantially spans a linear distance along said drive shaft corresponding to said region defined by said first and said second radial blade stations.

3. The drive shaft of claim 2,
    wherein said fan blades define a third radial blade station on said blade plane, said second and said third radial blade stations defining a region therebetween; and
    further comprising a transition region interposed between said inboard region and said outboard region of said drive shaft casing, said transition region defining a tapered thickness profile relative to said high speed flow of air, said transition region spanning a linear distance along said drive shaft corresponding to said region defined by said second and said third radial blade stations.

4. The drive shaft casing of claim 3, wherein:
    each of said plurality of blades is mounted to said hub at a blade root and extends radially to a blade tip, and wherein said first radial blade station corresponds to said blade tip.

5. The drive shaft casing of claim 4, wherein:
    each of said plurality of blades defines a blade length extending radially from said blade root to said blade tip, and wherein said second blade station is defined at a position between 75% and 85% of said blade length.

6. The drive shaft casing of claim 5, wherein said third blade station is defined at a position between 60% and 70% of said blade length.

7. In a helicopter having an empennage structure including a shroud and a ducted fan anti-torque device, said ducted fan anti-torque device including:
    (a) an airflow duct extending through said shroud, said airflow duct defining an inner surface and a longitudinal axis;
    (b) a fan assembly mounted in said airflow duct for generating a high speed flow of air for yaw stability and maneuverability of said helicopter, said fan assembly comprising
        a hub coaxially mounted about said longitudinal axis, and
        a plurality of fan blades connected to said hub, said plurality of fan blades defining a blade plane; and
    (c) a drive shaft extending through an opening in said inner surface of said airflow duct and connected to said hub for driving said fan blades, said drive shaft being disposed adjacent to said blade plane such that said drive shaft is disposed within said high speed flow of air; and
    said ducted fan anti-torque device being characterized by a drive shaft casing formed from radar absorbing material and disposed about said drive shaft, said drive shaft casing comprising:
        an inboard region spaced proximal to said hub and defining a thickness profile relative to said high speed flow of air; and
        an outboard region spaced proximal to said inner surface of said airflow duct and defining a thickness profile relative to said high speed flow of air, said thickness profile for said outboard region being less than said thickness profile for said inboard region.

8. The ducted fan anti-torque device of claim 7, wherein said fan blades define a first radial blade station and a second radial blade station on said blade plane, said first and said second radial blade stations defining a region therebetween, and wherein said outboard region of said drive shaft casing substantially spans a linear distance along said drive shaft corresponding to said region defined by said first and said second radial blade stations.

9. The ducted fan anti-torque device of claim 8,
    wherein said fan blades define a third radial blade station on said blade plane, said second and said third radial blade stations defining a region therebetween; and
    further comprising a transition region interposed between said inboard region and said outboard region of said drive shaft casing, said transition region defining a tapered thickness profile relative to said high speed flow of air, said transition region spanning a linear distance along said drive shaft corresponding to said region defined by said second and said third radial blade stations.

10. The ducted fan anti-torque device of claim 9, wherein:

each of said plurality of blades is mounted to said hub at a blade root and extends radially to a blade tip, and wherein said first radial blade station corresponds to said blade tip.

11. The ducted fan anti-torque device of claim 10, wherein:

each of said plurality of blades defines a blade length extending radially from said blade root to said blade tip, and wherein said second blade station is defined at a position between 75% and 85% of said blade length.

12. The ducted fan anti-torque device of claim 11, wherein said third blade station is defined at a position between 60% and 70% of said blade length.

* * * * *